United States Patent
Dourra et al.

(10) Patent No.: US 9,395,233 B2
(45) Date of Patent: Jul. 19, 2016

(54) MASS, DRAG COEFFICIENT AND INCLINATION DETERMINATION USING ACCELEROMETER SENSOR

(75) Inventors: Hussein A. Dourra, Bloomfield, MI (US); Michael A. Hall, Orion, MI (US); Peter G. Hartman, West Bloomfield, MI (US)

(73) Assignee: FCA US LLC, Auburn Hills, MI (US)

( * ) Notice: Subject to any disclaimer, the term of this patent is extended or adjusted under 35 U.S.C. 154(b) by 967 days.

(21) Appl. No.: 12/684,145

(22) Filed: Jan. 8, 2010

(65) Prior Publication Data

US 2011/0172877 A1 Jul. 14, 2011

(51) Int. Cl.
*G01G 19/08* (2006.01)
*F16H 59/52* (2006.01)
*F16H 59/66* (2006.01)
*B60T 8/18* (2006.01)
*B60T 8/24* (2006.01)
*F16H 59/48* (2006.01)

(52) U.S. Cl.
CPC ............ *G01G 19/086* (2013.01); *B60T 8/1837* (2013.01); *B60T 8/1887* (2013.01); *B60T 8/245* (2013.01); *F16H 59/52* (2013.01); *F16H 59/66* (2013.01); *F16H 59/48* (2013.01)

(58) Field of Classification Search
CPC ..... G01G 19/086; B60T 8/245; B60T 8/1887; B60T 8/1837; F16H 59/52; F16H 59/66; F16H 59/48
USPC ..................... 701/29, 35, 36, 45, 48, 51, 124; 702/173–175
See application file for complete search history.

(56) References Cited

U.S. PATENT DOCUMENTS

| | | | | |
|---|---|---|---|---|
| 5,434,780 A * | 7/1995 | Kume et al. ..................... 701/65 |
| 5,491,630 A * | 2/1996 | Genise ................... F16H 59/52 |
| | | | | 180/197 |
| 5,610,372 A * | 3/1997 | Phillips et al. ............. 177/25.14 |
| 6,015,192 A * | 1/2000 | Fukumura ..................... 303/140 |
| 6,167,357 A * | 12/2000 | Zhu et al. ...................... 702/175 |
| 6,249,735 B1 | 6/2001 | Yamada et al. |
| 6,314,383 B1 * | 11/2001 | Leimbach et al. ............ 702/173 |
| 6,347,269 B1 * | 2/2002 | Hayakawa et al. ............. 701/51 |
| 6,438,510 B2 * | 8/2002 | Zhu et al. ...................... 702/175 |
| 7,877,199 B2 * | 1/2011 | Lu et al. ........................ 701/124 |
| 2001/0029419 A1 * | 10/2001 | Matsumoto et al. ............ 701/80 |
| 2004/0167705 A1 * | 8/2004 | Lingman et al. .............. 701/124 |

(Continued)

FOREIGN PATENT DOCUMENTS

DE 10245270 1/2004
DE 10244789 A1 * 4/2004 ............... G01G 9/00

(Continued)

OTHER PUBLICATIONS

Machine Translation: Hellmann et al., DE 10244789 A1, 2004, German Patent Office Publication.*

(Continued)

*Primary Examiner* — John Q Nguyen
*Assistant Examiner* — Nadeem Odeh
(74) *Attorney, Agent, or Firm* — Ralph E. Smith

(57) ABSTRACT

A method and system of determining a vehicle's driving characteristics such as the vehicle mass, drag force coefficients and driving surface inclination. The vehicle's mass, drag force coefficients and inclination are determined using signals input from the vehicle's accelerometer.

16 Claims, 11 Drawing Sheets

(56) References Cited

U.S. PATENT DOCUMENTS

| | | | |
|---|---|---|---|
| 2004/0181317 A1* | 9/2004 | Flechtner et al. | 701/1 |
| 2005/0010356 A1* | 1/2005 | Ishiguro et al. | 701/124 |
| 2005/0065695 A1* | 3/2005 | Grieser | 701/70 |
| 2009/0192760 A1* | 7/2009 | Dreier et al. | 702/173 |

FOREIGN PATENT DOCUMENTS

| | | | |
|---|---|---|---|
| DE | 10245270 A1 * | 4/2004 | G01G 19/08 |
| DE | 10244789 | 8/2004 | |
| JP | 2000283831 A * | 10/2000 | G01G 19/08 |
| SE | WO 2006033612 A1 * | 3/2006 | F16H 59/52 |
| WO | WO03016837 | 2/2003 | |

OTHER PUBLICATIONS

Vahidi et al., Recursive Least Squares with Forgetting for Online Estimation of Vehicle Mass and Road Grade: Theory and Experiments, 2005, Vehicle System Dynamics: International Journal of Vehicle Mechanics and Mobilitiy, vol. 43, Issue 1, 2005.*

Massel et al., Investigation of Different Techniques for Determining the Road Uphill Gradient and the Pitch Angle of Vehicles, 2004, Proceedings of the 2004 American Control Conference.*

* cited by examiner

MASS, DRAG COEFFICIENT AND INCLINATION DETERMINATION USING ACCELEROMETER SENSOR

FIELD OF THE INVENTION

The technology herein relates generally to using existing vehicular sensors to determine non-sensed vehicular characteristics. More particularly, the technology herein relates to using a vehicle's accelerometer to determine the vehicle's mass, drag coefficient and a driving surface incline.

BACKGROUND OF THE INVENTION

Modern vehicles such as automobiles include multiple control systems that regulate the operation of various components of the vehicle. In many cases, the control systems use input data from one or more sensors. The sensors provide data that is used to optimize the vehicle's operation. As the number of control systems increases and as the control systems themselves become more complex, additional sensors are often used to provide additional data to the control systems. However, the inclusion of additional sensors to the vehicle adds to the vehicle's complexity and cost.

One vehicle system that uses sensors for data input is the vehicle's powertrain and associated control system. The powertrain in a motor vehicle refers to the group of components that generate and deliver power to a road surface. The powertrain generally includes the motor vehicle's engine and transmission. Other vehicle components such as the vehicle's driveshafts, differentials and drive wheels may also be grouped as part of the powertrain. The powertrain is controlled using a control system. The control system ensures that the powertrain generates a desired power (for example, to propel a vehicle forward along a level surface). Optimal control of the powertrain, however, requires knowledge of the vehicle's mass, among other factors. For instance, knowledge of the vehicle's mass is necessary to determine how to modify a "driving strategy." Driving strategy dictates shift pattern (or when to shift gears of the vehicle) and is compensated by knowledge of the vehicle's mass.

Because a vehicle's mass can dramatically change during operation of the vehicle, optimum operation of the vehicle's powertrain requires that the vehicle's mass be frequently determined. For example, in a commercial vehicle, a fully loaded vehicle could have a mass that is as much as three times the mass of the unloaded vehicle. Non-commercial vehicles also change mass as a result of loading and unloading, hitching trailers and other accessories that add to or otherwise change the total mass being driven by the vehicle's powertrain.

In order to dynamically measure a vehicle's mass and provide input to the vehicle's powertrain, some commercial vehicles include one or more mass detection sensors. These sensors are designed specifically to determine the vehicle's mass, and, as an extra component, add to the overall cost and complexity of the vehicle. Perhaps because of this additional cost, non-commercial vehicles generally do not utilize the additional mass detection sensors. Instead, an approximate mass value for the vehicle is used as a constant, non-changing input to powertrain calculations. While this reduces initial cost and complexity, the use of the constant mass value regardless of changes in the vehicle's mass results in sub-optimal control of the vehicle's powertrain.

There exists, then, a need and a desire for a system capable of dynamically calculating a vehicle's mass and other characteristics without using additional mass detection sensors.

BRIEF SUMMARY OF THE INVENTION

In various example embodiments, the technology described herein provides a method and system for determining vehicle driving characteristics such as the vehicle mass, drag force coefficients and driving surface inclination. The vehicle's mass, drag force coefficients and inclination are determined using signals input from the vehicle's accelerometer. The determination is accomplished without requiring a signal from a specialized mass, drag force or inclination sensor.

There has thus been outlined, rather broadly, the features of the technology in order that the detailed description that follows may be better understood, and in order that the present contribution to the art may be better appreciated. There are additional features of the technology that will be described and which will form the subject matter of the claims. Additional aspects and advantages of the technology will be apparent from the following detailed description of an exemplary embodiment which is illustrated in the accompanying drawings. The technology is capable of other embodiments and of being practiced and earned out in various ways. Also, it is to be understood that the phraseology and terminology employed are for the purpose of description and should not be regarded as limiting.

BRIEF DESCRIPTION OF THE DRAWINGS

The technology is illustrated and described herein with reference to the various drawings, in which like reference numbers denote like method steps and/or system components, and in which.

DETAILED DESCRIPTION OF THE INVENTION

Before describing the disclosed embodiments of the technology in detail, it is to be understood that the technology is not limited in its application to the details of the particular arrangement shown here since the technology is capable of other embodiments. Also, the terminology used herein is for the purpose of description and not of limitation.

In various example embodiments, the technology described herein provides methods of determining a vehicle's mass by using data output by the vehicle's accelerometer. The vehicle's drag coefficient and the incline of the vehicle's driving surface may also be determined using the vehicle's accelerometer. Applications of said determinations are also provided herein as various example embodiments. Other applications and comparable uses are also contemplated herein, as will be obvious to those of ordinary skill in the art.

The mass of a vehicle may be dynamically determined without the use of specific mass detection sensors. Instead, mass determination is facilitated using other sensors and torque models already calculated and utilized by the vehicle control system. For example, a vehicle's mass may be determined using knowledge of the vehicle's longitudinal acceleration, speed and powertrain output torque, as explained below.

Figure 1:
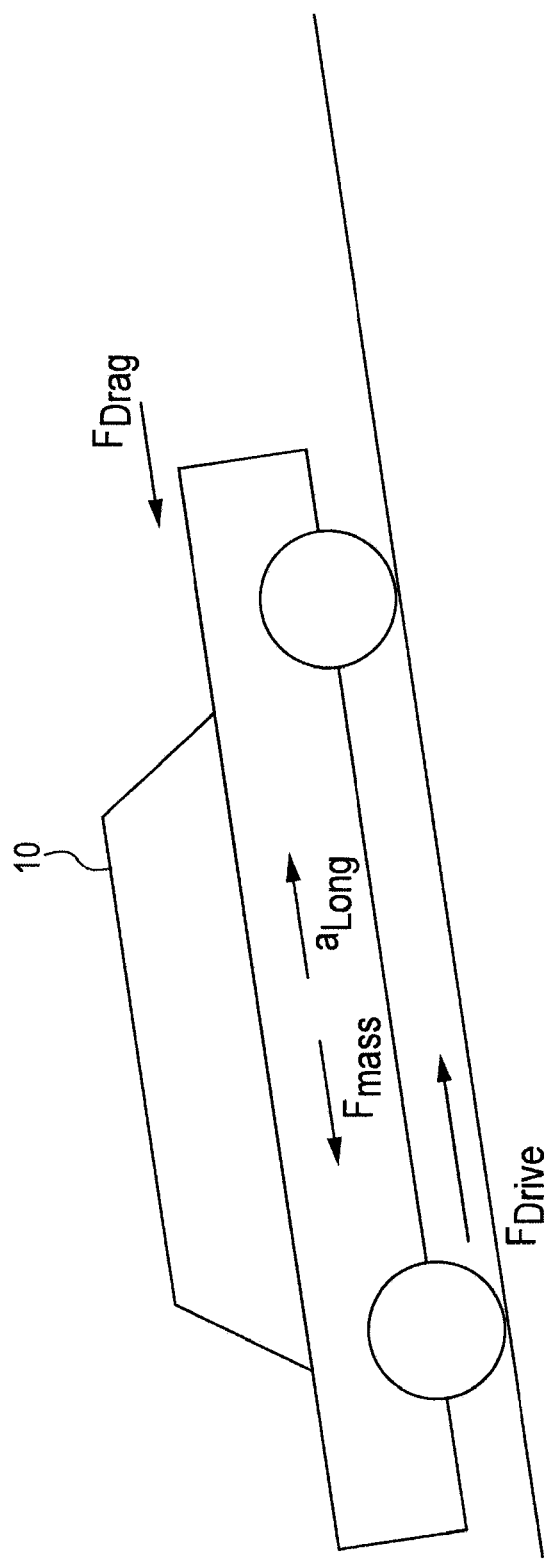
FIG. 1 is an illustration of forces exerted by or on a motor vehicle, according to a disclosed embodiment.

FIG. 1 illustrates the typical longitudinal forces exerted on a motor vehicle 10. These forces include the longitudinal forces due to the vehicle's mass, summarized as the vehicle's mass force $F_{Mass}$. The mass force $F_{Mass}$ includes forces that arise from changes in vehicle speed and from the grade of the driving surface. The drive force $F_{Drive}$ is the force resulting from the powertrain operation that propels the vehicle 10 forward. The drive force $F_{Drive}$ is opposed by a drag force $F_{Drag}$. The drag force $F_{Drag}$ is the force acting upon the vehicle 10 by friction with external surfaces or volumes. For example, the drag force $F_{Drag}$ includes aero-induced drag as well as tire-based frictional forces that may be described as a function of vehicle speed. The vehicle 10 includes at least one accelerometer that measures the vehicle's longitudinal acceleration $a_{Long}$. The relationship between the identified longitudinal forces may be summarized as shown below in equation 1.

$$F_{Drive} = F_{Drag} + F_{Mass} \quad \text{Equation 1.}$$

Mass force $F_{Mass}$ may also be written in terms of longitudinal acceleration $a_{Long}$, as illustrated below in equation 2.

$$F_{Mass} = m \cdot a_{Long} \quad \text{Equation 2.}$$

The longitudinal acceleration $a_{Long}$ used in equation 2 and associated with the mass force $F_{Mass}$ may be directly read from the vehicle's accelerometer. Therefore, equation 1 may be rewritten as equation 3, where longitudinal acceleration $a_{Long}$ is a known value.

$$F_{Drive} = F_{Drag} + m \cdot a_{Long} \quad \text{Equation 3.}$$

From equation 3, the vehicle's mass may be determined with knowledge of the vehicle's drive force $F_{Drive}$, the drag force $F_{Drag}$, and the longitudinal acceleration $a_{Long}$. The vehicle's longitudinal acceleration $a_{Long}$ is known from the vehicle's accelerometer. The vehicle's drive force $F_{Drive}$ can be derived from the vehicle powertrain's output torque, as explained below. Additionally, it is reasonable to assume that, for a short period of time on any given journey by the vehicle, external conditions that affect the drag force $F_{Drag}$ are generally constant. Therefore, the drag force $F_{Drag}$ for vehicle 10 will be constant for any given vehicle velocity during the short period of time on any given journey. In other words, regardless of whether the vehicle 10 is traveling 20 miles/hour on flat terrain or 20 miles/hour on an incline, as long as the vehicle 10 is subject to the same external factors such as air and tire friction, the drag force $F_{Drag}$ applied to the vehicle 10 is the same in both situations. Mathematically, this is shown in equation 4. Equation 4 is derived from solving equation 3 for the drag force $F_{Drag}$, applying the solution to two different scenarios (scenario 1 and scenario 2, each with a corresponding drive force $F_{Drive1}$, $F_{Drive2}$, a corresponding mass force $F_{Mass1}$, $F_{Mass2}$, and a corresponding drag force $F_{Drag1}$, $F_{Drag2}$), and then assuming that the two drag forces $F_{Drag1}$, $F_{Drag2}$ are the same for a given speed and time period. Therefore, equation 4 is true for a given vehicle considered at scenario 1 and scenario 2, where the vehicle's velocity and external friction-induced drag forces are constant in both scenarios.

$$F_{Drive1} - F_{Mass1} = F_{Drive2} - F_{Mass2} \quad \text{Equation 4.}$$

Equation 2 can be applied to equation 4. Appropriate rearrangement of equation 4 yields equation 5. Equation 5 can be solved for the vehicle's mass m, as indicated in equation 6. Therefore, the mass m of vehicle 10 may be calculated if the vehicle's accelerometer output is known at two different times when the vehicle is traveling at the same velocity, and if the vehicle's drive force $F_{Drive}$ is also known for the given times.

$$F_{Drive2} - F_{Drive1} = m \cdot (a_{Long2} - a_{Long1}) \quad \text{Equation 5.}$$

$$m = (F_{Drive2} - F_{Drive1})/(a_{Long2} - a_{Long1}) \quad \text{Equation 6.}$$

As mentioned above, the drive force $F_{Drive}$ for vehicle 10 may be derived from the output torque of the vehicle's axle. The drive force $F_{Drive}$ is the force that the vehicle's tire exerts on the driving surface, therefore any relationship between the output torque of the vehicle's axle and the drive force $F_{Drive}$ must consider any vehicle components through which the drive force $F_{Drive}$ is applied between the vehicle's axle and the road. These components include wheel bearings, brakes and tires. In general, then, the drive force $F_{Drive}$ for vehicle 10 is related to the force resulting from the vehicle's axle torque less any drag force caused by the intermediary components. The force resulting from the vehicle's axle torque is equal to the axle torque $T_{Axle}$ divided by the vehicle's tire radius $r_{Tire}$ (or the distance between the vehicle's axle and the driving surface), as illustrated in equation 7. While drive force may be modeled using more complex models that include components of driveline torque that are functions of vehicle speed, these components may be neglected, since they do not affect the value of the $\delta F_{Drive}/\delta a_{Long}$ ratio of equation 6.

$$F_{Drive} = \left(\frac{T_{Axle}}{r_{Tire}}\right). \quad \text{Equation 7}$$

Figure 2:
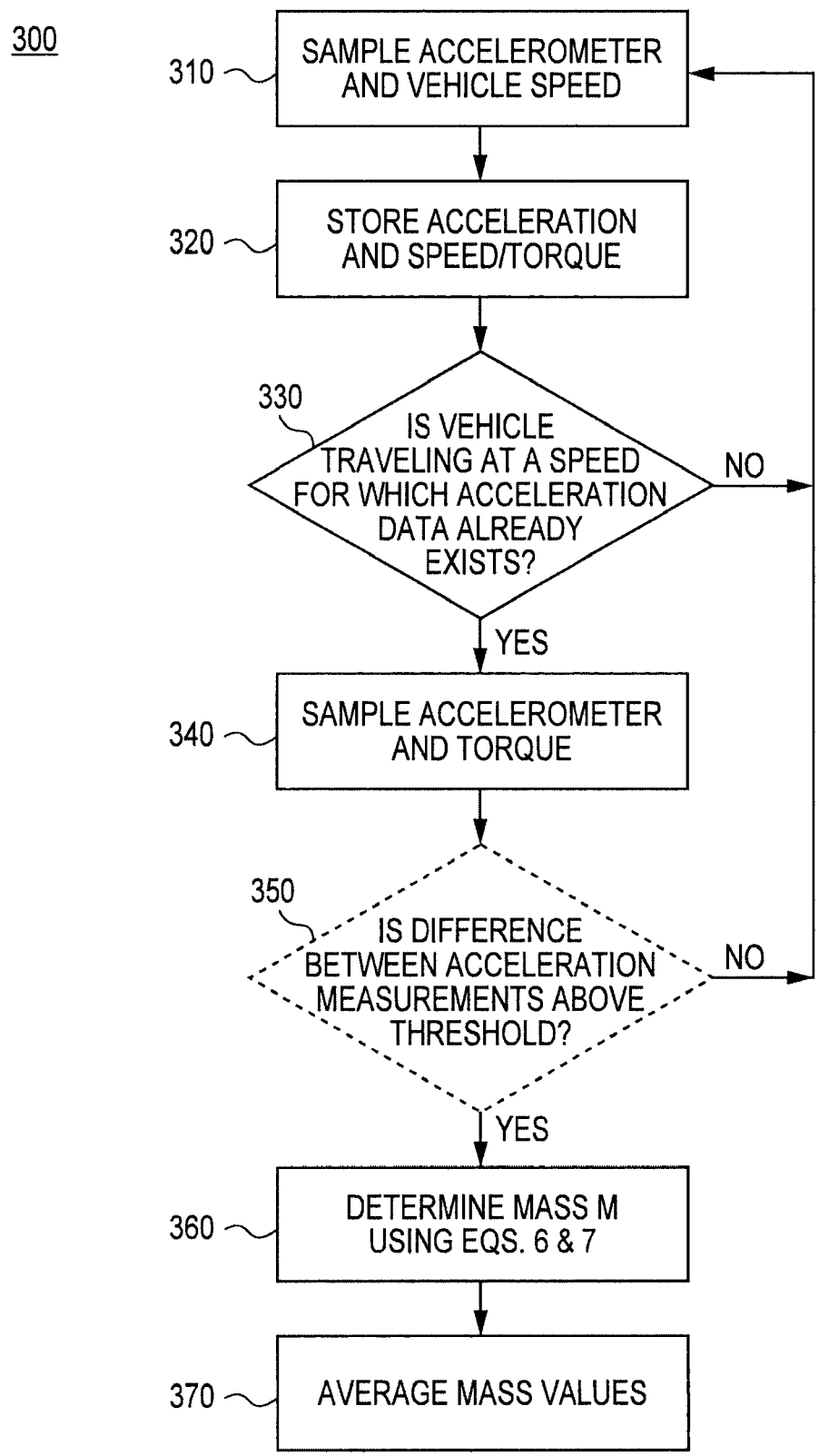
FIG. 2 illustrates a method of determining a vehicle's mass, according to a disclosed embodiment.

Determination of a vehicle's mass using equations 6 and 7 is performed using various methods, as explained below. In a first method 300, illustrated in FIG. 2, vehicle accelerometers are used to make measurements at a variety of different speeds (step 310). Each accelerometer measurement is stored in memory with associated axle torque data (step 320). When the vehicle 10 returns to a speed for which measurements had previously been taken (step 330), additional measurements are made (step 340), equations 6 and 7 are invoked, and a mass for the vehicle 10 is determined (step 360). If desired, the mass determination step can be made optional, only occurring if the difference between the current measurements and the stored measurements is greater than a predefined threshold (optional step 350). This process is repeated for each of many different speeds at which measurements are taken. The final results from each speed are averaged together to yield a determined mass for the vehicle (step 370).

Figure 3A:
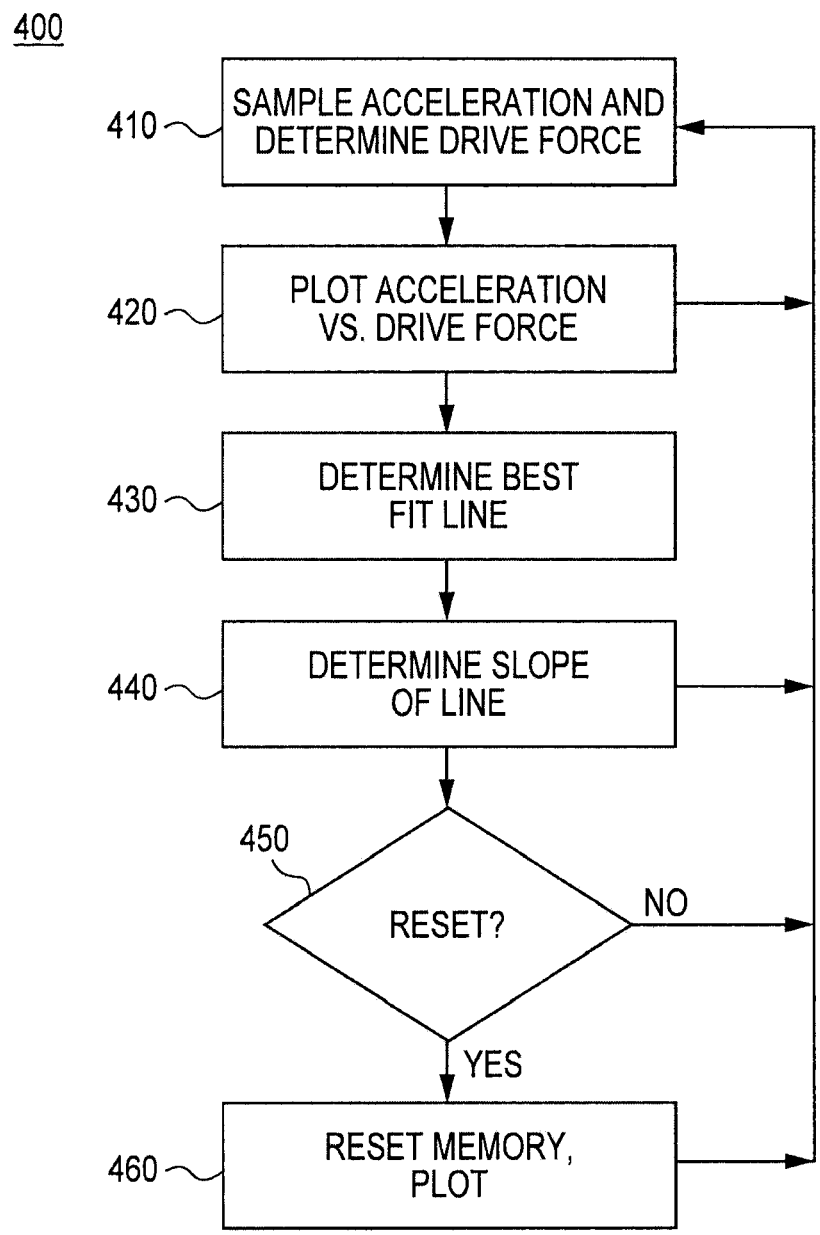
FIG. 3A illustrates a method of determining a vehicle's mass, according to a disclosed embodiment.
Figure 3B:
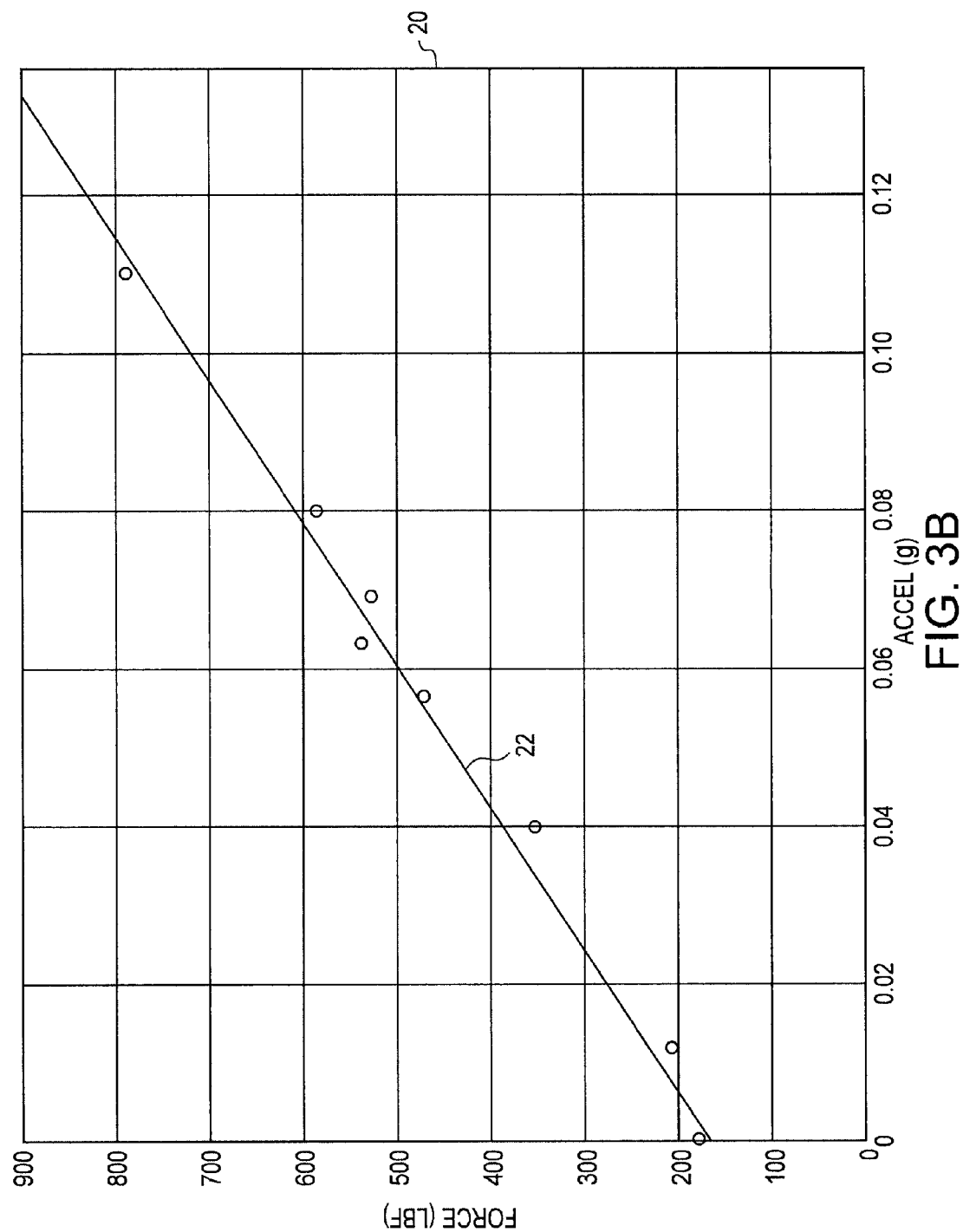
FIG. 3B is a graph illustrating a method of determining a vehicle's mass, according to a disclosed embodiment.

In a second method, illustrated in FIGS. 3A and 3B, a least squares method is applied to determine the vehicle's mass. In the least squares method 400, the vehicle's longitudinal acceleration $a_{Long}$ is measured using an accelerometer and the vehicle's drive force $F_{Drive}$ is determined from the vehicle's axle torque and speed (using equation 7) (step 410). These measurements are made for a given time and the resulting drive force $F_{Drive}$ is plotted against the corresponding longitudinal acceleration $a_{Long}$ (step 420) (see also graph 20 of FIG. 3B). These measurements are repeated many times. For each measurement, the resulting data point is added to the graph 20. As equation 6 demonstrates, the vehicle mass m is equal to the slope of a line connecting data points of drive force $F_{Drive}$ plotted against longitudinal acceleration $a_{Long}$. The distribution of the data points may be approximated as a line or any other desired function (step 430). In the example of FIG. 3B, a line 22 is determined using a least squares method. The line 22 is fit to the data points plotted in graph 20, and the slope of the interpolated line 22 is the determined mass m of the vehicle 10 (step 440). Data points continue to be added to the graph 20, and the slope of the fitted line 22 is adjusted until a reset signal is received (as further explained below), wherein the process begins anew (steps 450, 460). If desired, the least squares method can proceed by adding new data points while disposing of sufficiently old data points to keep the slope of the determined line 22 based primarily upon recent data points.

Under the least squares method, the determined line is modeled as a first-degree polynomial function in the standard form of y=m*x+b, where y and x represent data points along the y-axis and x-axis, respectively, m represents the slope of the polynomial function (remember, the slope is also representative of mass m), and b is the y-intercept. The slope m and y-intercept b values are given generically in equations 8 and 9, where x and y values may be substituted by data points for longitudinal acceleration $a_{Long}$ and drive force $F_{Drive}$, respectively, in the current application.

$$m = \frac{(\sum y)(\sum x) - n(\sum xy)}{(\sum x)^2 - n(\sum x^2)}.$$ Equation 8

$$b = \frac{(\sum x)(\sum xy) - (\sum y)(\sum x^2)}{(\sum x)^2 - n(\sum x^2)}.$$ Equation 9

Figure 4:
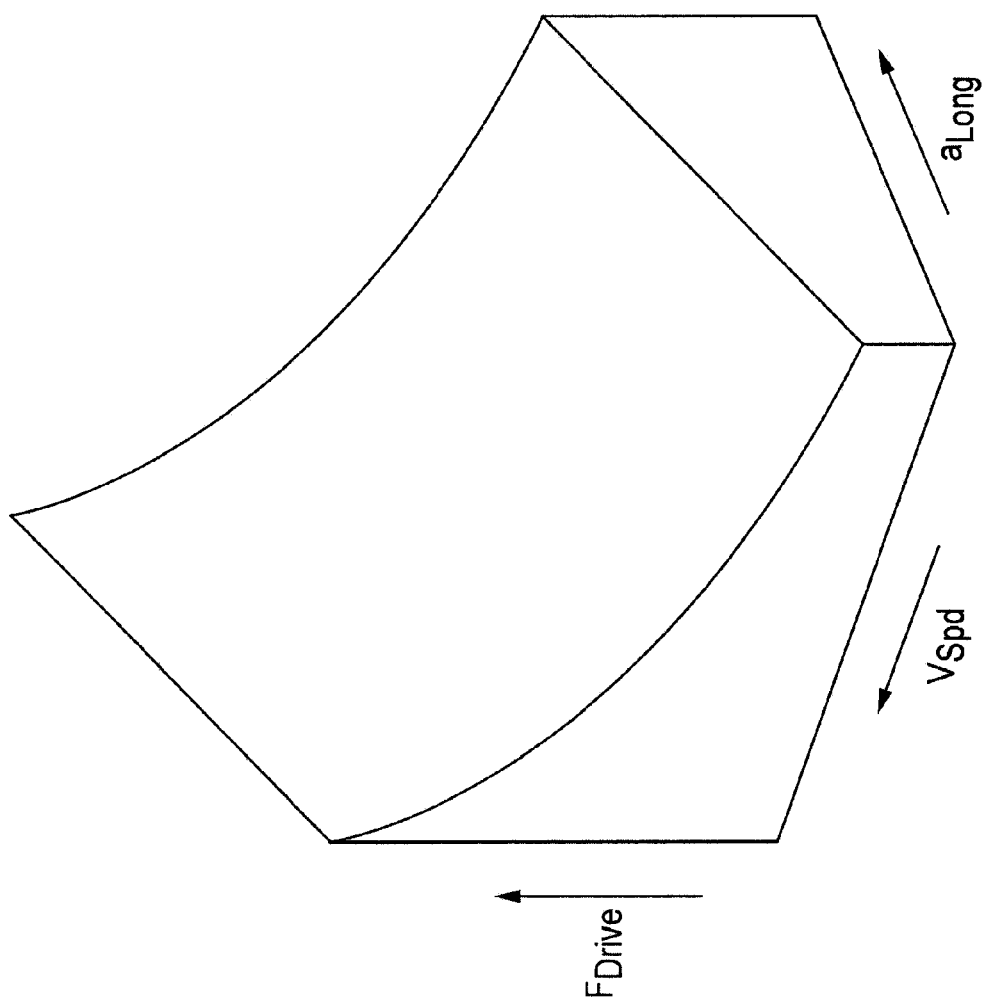
FIG. 4 is a graph illustrating a value of drive force $F_{Drive}$ in terms of vehicle speed $V_{Spd}$ and longitudinal acceleration $a_{Long}$, according to a disclosed embodiment.
Figure 5A:
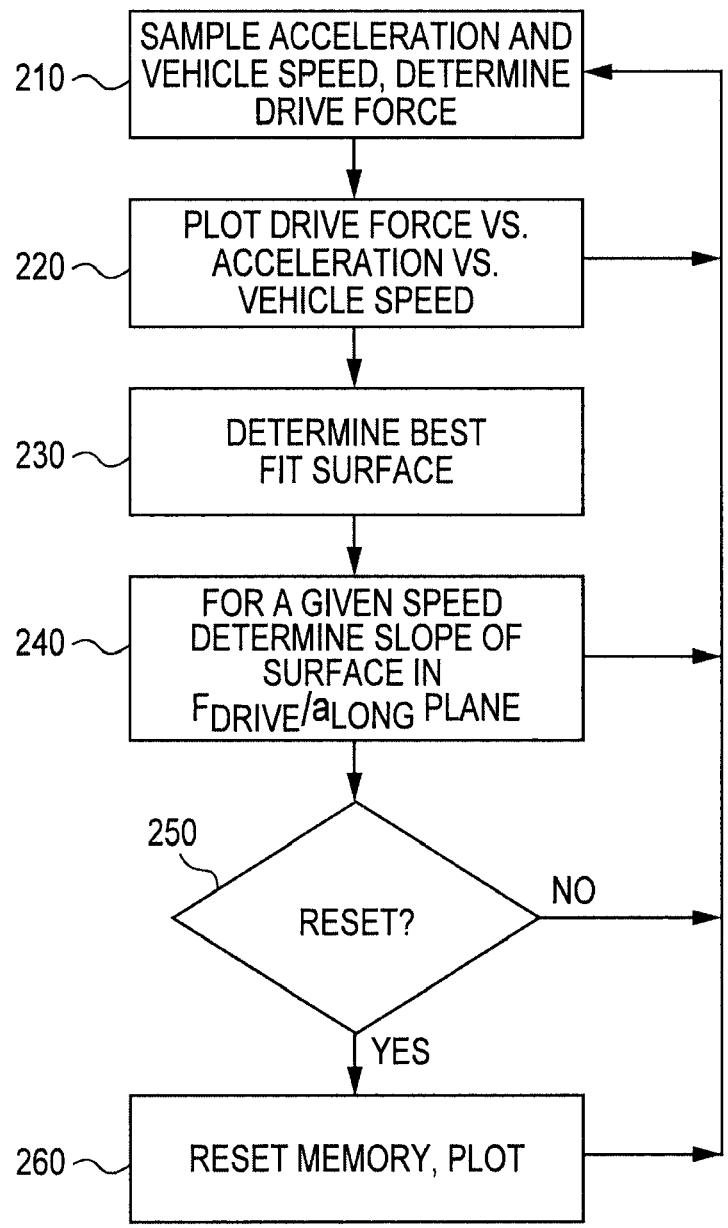
FIG. 5A illustrates a method of determining a vehicle's mass, according to a disclosed embodiment.
Figure 5B:
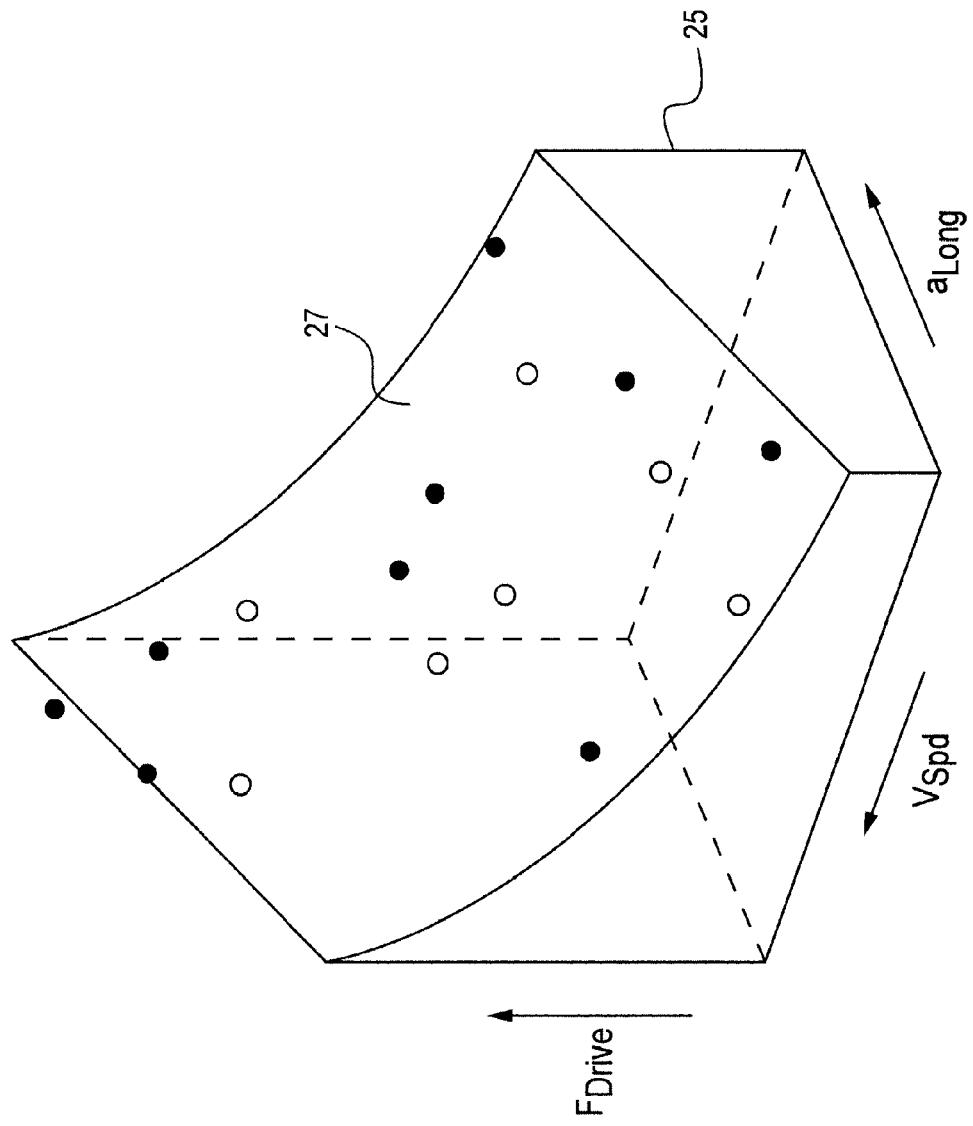
FIG. 5B is a graph illustrating a method of determining a vehicle's mass, according to a disclosed embodiment.

In a third method, the principles of equations 6 and 7 and FIG. 3B are extrapolated from a two-dimensional slope determination and applied to a three-dimensional surface determination. Recall from equation 3 that drive force $F_{Drive}$ is equal to the sum of the drag force $F_{Drag}$ and mass force $F_{Mass}$, which is also mass m multiplied by longitudinal acceleration $a_{Long}$. The drag force $F_{Drag}$ may be modeled according to equation 10, where $V_{Spd}$ is the vehicle speed and A, B and C are coastdown coefficients. Thus, equation 3 may be rewritten as equation 11. Equation 11 is illustrated in FIG. 4, which shows a value for drive force $F_{Drive}$ in terms of vehicle speed $V_{Spd}$ and longitudinal acceleration $a_{Long}$. If the value of the drive force $F_{Drive}$ is known using equation 7, and the values of longitudinal acceleration $a_{Long}$ and vehicle speed $V_{Spd}$ are known from the appropriate sensors, the mass m and coefficients A, B, C of equation 11 may be simultaneously solved using a regression function. Therefore, using the regression function, the data is fit to a surface whose slope in the drive force $F_{Drive}$/longitudinal acceleration $a_{Long}$ plane is the value of the vehicle's mass m. This is illustrated in FIGS. 5A and 5B. A least squares method may be efficiently used to solve for the coefficients A, B, C and the mass m.

$$F_{Drag}=A+B \cdot V_{Spd}+C \cdot V_{Spd}^2$$ Equation 10.

$$F_{Drive}=m \cdot a_{Long}+A+B \cdot V_{Spd}+C \cdot V_{Spd}^2$$ Equation 11.

In the third method 200, the vehicle's longitudinal acceleration $a_{Long}$ is measured using an accelerometer and the vehicle's drive force $F_{Drive}$ is determined from the vehicle's axle torque and speed (using equation 7) (step 210), just as in step 410 of method 400. Additionally, the vehicle's speed $V_{Spd}$ is determined as well. Using these data sources and the least squares recursive method, equation 11 is solved and the drive force $F_{Drive}$ is plotted as a function of vehicle speed $V_{Spd}$ and longitudinal acceleration $a_{Long}$ (step 220) (see also graph 24 of FIG. 5B). These measurements are repeated many times. For each measurement, the resulting data point is added to the graph 25. The distribution of the data points may be approximated as a surface representing drive force $F_{Drive}$ (step 230). As equation 6 demonstrates, the vehicle mass m is equal to the slope of the drive force $F_{Drive}$ surface in the drive force $F_{Drive}$/longitudinal acceleration $a_{Long}$ plane. In the example of FIG. 5B, a surface 27 is determined using the least squares method. The surface 27 is fit to the data points plotted in graph 25. Solid data points are located above the best fit surface, while hollow data point are located below the determined surface. The slope of the interpolated surface 27 in the drive force $F_{Drive}$/longitudinal acceleration $a_{Long}$ plane is the determined mass m of the vehicle 10 (step 240). Data points continue to be added to the graph 25, and the surface 27 is adjusted until a reset signal is received (as further explained below), wherein the process begins anew (steps 250, 260). If desired, the least squares method can proceed by adding new data points while disposing of sufficiently old data points to keep the surface 27 based primarily upon recent data points.

While vehicle mass m determined using any of the methods presented above may be sufficient for most purposes, the mass determination may be further refined by accounting for many other variables that may affect the accelerometer measurements. Refinements can be made, for example, to correct for the effects of pitch and lateral acceleration. Vehicle pitch may be caused by acceleration, air drag and load, while lateral acceleration may be caused by cornering, as explained below.

During acceleration, a vehicle may pitch in one or more directions. For example, as a vehicle accelerates in a forward-moving direction, the vehicle may pitch backwards. A forward-moving vehicle that suddenly decelerates may pitch forward. This pitching action results in the vehicle's accelerometer being pitched or tilted as well. In the methods presented above, however, the accelerometer output, or the longitudinal acceleration $a_{Long}$ signal, is assumed to be parallel to the driving surface. Therefore, measurements made from the vehicle's accelerometer when the vehicle is pitching as a result of vehicle acceleration may introduce error into the mass determination.

Vehicle and accelerometer pitch caused by acceleration is compensated by modifying the accelerometer signal according to a pitch stiffness of the vehicle. Vehicles have a pitch stiffness that is based on the vehicle's suspension system. The vehicle's pitch stiffness describes the amount of pitch the vehicle experiences as a function of acceleration. For example, a given vehicle may experience four degrees of pitch for the first "g" of acceleration (1 g). Additional "g's" may result in additional pitch, though the relationship between the vehicle's pitch and the vehicle's acceleration is rarely linear. The vehicle's pitch stiffness can be experimentally determined, with the results being stored for use by the vehicle as a lookup table or other data structure. Thus, to correct a vehicle's mass calculation for the vehicle's acceleration-based pitch, the signal measured from the vehicle's accelerometer is adjusted using the angle of vehicle pitch experimentally known to occur for the measured acceleration. Therefore, the signal value used as longitudinal acceleration $a_{Long}$ is a component of the signal output by a vehicle's accelerometer.

Lateral loads on the vehicle, which are produced during cornering events, affect the longitudinal acceleration and drive force signals. The longitudinal acceleration is affected because the centripetal acceleration generated in a corner does not necessarily point at a right angle to the longitudinal accelerometer. This effect must be corrected on the longitudinal acceleration signal. Additionally, the slip angle that produces lateral acceleration increases tire drag. Because of this effect, the lateral acceleration is monitored, and the drive force is corrected accordingly.

Additional sources of vehicle pitch may also be compensated for in the mass determinations, depending on the severity of the pitch-based effect. For example, if the vehicle's accelerometer is installed in the vehicle so that the accelerometer is tilted relative to the driving surface, the angle of tilt could be factored into the determination of longitudinal acceleration $a_{Long}$. Additionally, aero drag can result in vehicle pitch. However, because the above-described methods determine mass by comparing two or more different measurements during a vehicle's journey, any offset caused by drag is generally minimal and, if desired, could be ignored. Similarly, although various vehicle loads may affect the vehicle's pitch, the effect of load in the calculation of the vehicle's mass m is generally ignored because pitch changes due to load are relatively constant for a journey. Because equation 6, for example, reflects a difference measurement, the effect of load pitch is either canceled out or is negligible.

Other conditions that may be accounted for include dynamic events due to bumps in the driving surface, for example. Instead of modeling body damping and other vehicle movements resulting from the driving surface conditions, the methods recognize transient events and then ignore data generated by these dynamic events. The events may be detected by comparing a body acceleration calculated from the transmission output speed with the longitudinal acceleration $a_{Long}$ output from the vehicle's accelerometer. When the rates of these two accelerations are significantly different, then the body is known to be pitching in a transient event. When the change in acceleration is near zero, then an absolute limit between the accelerations is imposed.

Transient events may also be determined by monitoring drive force $F_{Drive}$ and longitudinal acceleration $a_{Long}$ rates. Experiments have shown that the timing of acceleration and force signals is difficult to match during transient events. Therefore, drive force and acceleration data that is not within a calibratable limit is assumed to represent a transient event and is ignored.

Other conditions that may need to be accounted for include the effect of cold temperatures. Driveline drag increases significantly when fluids are cold. While this effect is modeled in much of the powertrain, the models are inadequate when temperatures become extreme. Therefore, if vehicle temperatures are less than a predetermined threshold, data collected at the extreme temperatures is not used.

Many other conditions may affect the mass determination, including shift position and a shift-in-progress event. If necessary, data collected at these times can be ignored.

Input data such as vehicle speed $V_{Spd}$, longitudinal acceleration $a_{Long}$ and axle torque $T_{Axle}$ can each be refined for use in the above-described methods by collecting and averaging a sufficient number of samples. Sample collection must generally occur within certain constraints. For example, samples collected while the vehicle is braking are not used. In general, the above-described methods are most accurate when vehicle axle speed is above 150 revolutions/minute. In this axle speed range, samples may be collected every 0.02 seconds, for example, with 40 samples being sufficient for calibration and averaging.

Additionally, confidence in the accuracy of mass calculations is improved when the number of data points collected is above a minimal threshold and a high percentage of the data points have values within a predetermined spread or percentage range. The minimum number of data points, the percentage of data that must be within a predetermined spread, and the predetermined spread values may all be determined experimentally.

Because a vehicle's mass may change dramatically over time (due to, for example, the loading or unloading of the vehicle or the attaching of trailers to a vehicle), accurate mass determinations using either of the methods presented in FIG. 3A-3B or 4 must be able to account for changes in mass that occur during the vehicle's journey. One method of accounting for changes in mass, as applied using the least squares method of FIG. 3A, is to only consider the most recent data points in determining the line or surface fitted to the data points. As an example, in the least squares method, the slope of a line fitted to the data points could be determined with relation to the most recent 1500 data points. Thus, if the mass of the vehicle changes, the determined slope of the line will converge to the new mass as new data points are added to the plot, displacing old data points. Once 1500 data points have been plotted after the change in mass, the slope of the best-fitted line should approximate the new mass of the vehicle. While this method results in a stable mass determination that is generally invariant to noise and other artifacts, the adjustment of the mass determination using this method may be slower than desired.

Another option for adjusting the mass calculation when the vehicle's mass changes is to reset the data points every time the vehicle comes to a stop. In this scenario, mass calculations would only require a small number of data points (e.g., 100) for consideration in determining the best fit for a line whose slope indicates the mass of the vehicle. This solution has a quick response time to changes in the vehicle's mass, but introduces noise and inaccuracy in the resultant slope.

Figure 6:
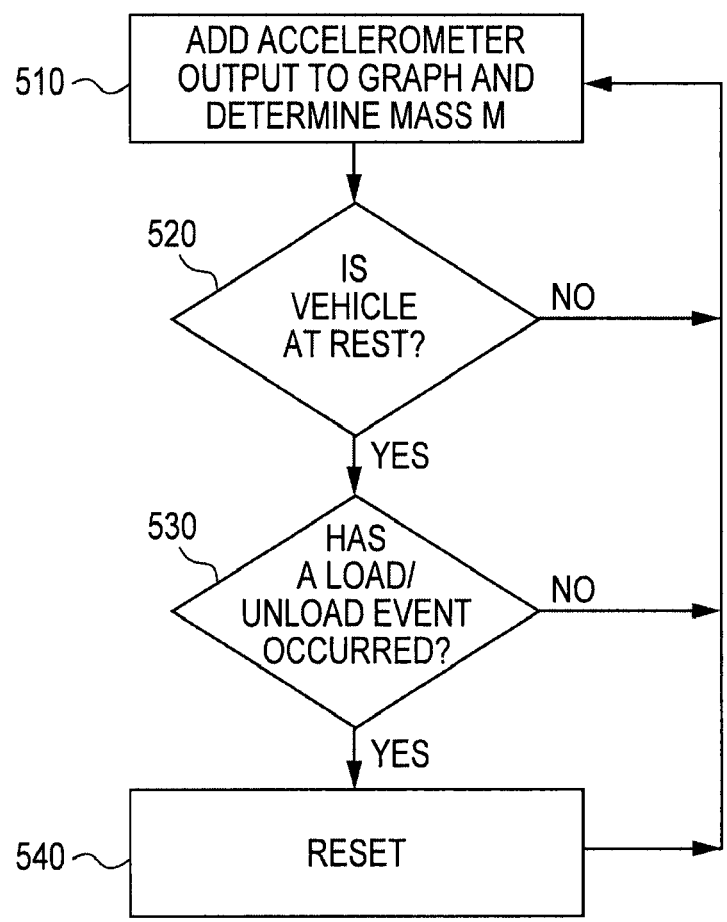
FIG. 6 illustrates a method of determining when to reset a vehicle mass calculation, according to a disclosed embodiment.

A third and desired option combines the long averages of the first option and the reset capabilities of the second option. Experimental observation shows that load or unload events may be detected by the vehicle's accelerometer. For example, when 40-pound bags of salt are loaded or unloaded from a pickup truck, the truck bounces, an event that results in accelerometer output spikes. Additionally, when a trailer is hitched to a pickup truck, the additional weight causes the vehicle to pitch. Thus, in the third option, as illustrated in method 500 of FIG. 6, the accelerometer output is monitored (step 510) for spikes indicative of load or unload events when a vehicle has come to rest (520). If the monitored accelerometer indicates a significant change (step 530), the memory is reset (step 540). If not, the mass calculation/slope determination continues to use the most recent data points. In this way, the method 500 is able to differentiate between frequent vehicular stops for traffic signals and relatively infrequent load/unload events. Accuracy and stability of the determinations are thus improved while good response times are still available.

The accuracy of the mass determinations described above may be further refined by incorporating additional methods for mass determinations into the above methods. While specific alternative methods to mass determination may not be independently sufficiently accurate, when used in conjunction with the above described mass determination methods, the alternative methods can improve the accuracy of the determined mass. One such alternative method that may be used in combination with the above methods uses brake torque measurements to collect additional data points.

Typically, in the above-described methods, acceleration and drive force data would not be collected during a braking event. However, braking events may still be useful. Most brake systems use a pressure transducer to determine the cylinder pressure applied during a braking event. Some brake systems may even include a pressure sensor at each wheel. Using these sensors and knowledge about the properties of the brake components, a value for axle torque $T_{Axle}$ may be calculated. The axle torque $T_{Axle}$ values determined through the brake system may be used to determine drive force $F_{Drive}$. The calculated drive force $F_{Drive}$ values are paired with corresponding longitudinal acceleration $a_{Long}$ values from the vehicle's accelerometer. The combined data points result in a greater number of data points to be used in fitting a line or a surface to the data points. As an additional benefit, braking events typically result in deceleration data that is higher in magnitude than that resulting from acceleration events. The resulting spread in the combined data points is greater than that which occurs using only powertrain torque data. A larger spread between a high number of data points results in a more accurately fitted line or surface. Therefore, by using brake torque data points in conjunction with powertrain drive torque data points in plotting a best-fit line or surface, fitting accuracy is improved.

Because determination of a vehicle's drive force $F_{Drive}$ using the vehicle's brake system is subject to certain errors, this method should only be applied when there is a high degree of confidence in the resulting data. Some of the errors that may occur from the braking system method of determining drive force $F_{Drive}$ include errors due to variations in the friction coefficients of the braking system components. These friction coefficients have been found to vary over a wide range of values. Therefore, determining accurate values for wheel torque using a vehicle's braking system may require development of a friction coefficient model that compensates for speed, temperature and brake pressure. Additionally, the unaccounted use of trailer brakes can significantly skew the values of wheel torque obtained using a vehicle's brake system. If a trailer being towed has its own brakes, the braking information of the trailer is not generally known by the vehicle, and thus the calculated values of wheel torque using the vehicle's brake system will not be complete or accurate.

Therefore, the data points arising from the vehicle's brake system are only included in the mass determination when confidence in the accuracy of the combined data points is high. A high confidence level may be obtained by first determining the vehicle's mass using the powertrain drive torque, then determining the vehicle's mass using the vehicle's brake system, and then comparing the results. When the compared results are similar, the results may be combined to yield a more refined value for the vehicle mass. When the results are disparate, only powertrain drive torque results are used.

Figure 7:
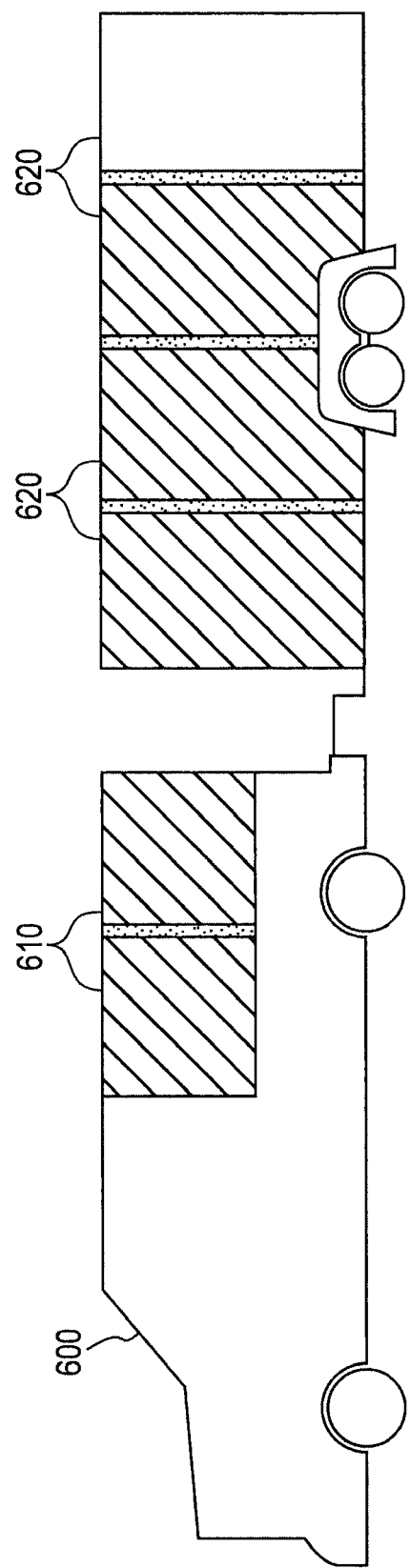
FIG. 7 illustrates a method of displaying a vehicle's relative mass, according to a disclosed embodiment.

Mass that is determined using any of the methods described above may be indicated to the driver of the vehicle. One display method illustrated in FIG. 7 includes a bar chart. In FIG. 7, the display 600 shows an outline of a vehicle with a number of cargo-shaped bars in the form of a bar graph. When the system detects a significant change in the vehicle's weight, the display 600 indicates the amount of cargo being carried by the vehicle using bars. For example, the cargo boxes 610 in the bed of the vehicle would fill when the measured cargo weight was equal to the gross vehicle weight rating (GVWR) of the vehicle. As additional mass is added, the boxes 620 in the trailer would continue to fill until the mass reached the gross combined weight rating (GCWR) of the vehicle. The display 600 could also alert the driver to which trailer classification is required and when trailer brakes are needed, based on the measured mass. In the example of FIG. 7, the vehicle is carrying cargo that exceeds the vehicle's GVWR but is still less than the vehicle's GCWR.

The mass determination using any of the above methods can be used in assisting in automatic trailer brake adjustment. Many pickup trucks include a trailer brake controller that allows a vehicle driver to manually adjust the amount of braking asserted by the trailer brake of an attached trailer. This adjustment is normally made each time the mass of the trailer is changed (upon load or unload events), or when a new trailer is connected to the vehicle. In an automatic trailer brake adjustment system, the amount of adjustment or the gain can be learned by the system by monitoring brake torque and vehicle longitudinal acceleration $a_{Long}$. The automatic adjustment system can also accept as input the result of a mass determination performed using any of the above-specified methods, thus indicating to the system when mass has changed and adjustment is needed.

Mass determinations may additionally be applied to a vehicle's electronic stability control (ESC) system to optimize the stability of the vehicle. Mass determinations can be used to enhance the effectiveness of exhaust braking and transmission shifting grade hunting logic. The mass determinations can enhance drive strategies for improved efficiency. Vehicles with high loads, as determined using the methods above, could even be equipped to communicate with other vehicles so as to alert neighboring vehicles to stay further away from the highly loaded vehicle. These and other applications of knowing a vehicle's mass are available.

In addition to using a vehicle's accelerometer to calculate the mass m of the vehicle, the vehicle's accelerometer can also be used to determine the drag force $F_{Drag}$ exerted on the vehicle. Recall that drag force $F_{Drag}$ includes the forces acting upon the vehicle due to aero, tire and mechanical drag in the driveline. The coefficients A, B, C in equation 10 are representative of these different types of drag. Tire and mechanical drag in the driveline is modeled using coastdown coefficients A and B. The effect of aero drag is modeled using coefficient C. Therefore, using equation 11 and the recursive method presented above for solving the coefficients A, B, C, the drag force $F_{Drag}$ may be calculated. This information is useful, for example, in determining and displaying to the driver of the vehicle the distance that the vehicle can travel until the fuel tank is empty. In addition, the value of coefficient B may be used to indicate the type of driving surface being driven on by the vehicle.

The vehicle accelerometer may also be used to determine the incline of the driving surface upon which the vehicle is driving. This determination can be performed using knowledge of the vehicle's longitudinal acceleration $a_{Long}$ and knowledge of the vehicle's body acceleration $a_{Veh}$. Body acceleration $a_{Veh}$ is determined as the time derivative of wheel or transmission output speed. Wheel speed is determined by multiplying a wheel's circumference with the number of rotations of the wheel in a given period of time (often denoted as RPM or revolutions per minute). A wheel's circumference is given by $\pi * d_{Tire}$, where $d_{Tire}$ is the diameter of the wheel. As vehicle sensors are able to measure the period of rotation of a wheel in minutes, the RPM is equivalent to $1/R_{FinalDrive}$, where $R_{FinalDrive}$ is the period in minutes of wheel rotation.

Therefore, converting minutes to seconds, the time derivative of the wheel speed is given by equation 12, where $N_{Out}$ represents the number of samples of the wheel rotation period $R_{FinalDrive}$.

$$a_{Veh} = \frac{\partial N_{Out}}{\partial t} \cdot \frac{(\pi \cdot d_{Tire})}{60 \cdot R_{FinalDrive}}. \quad \text{Equation 12}$$

Figure 8:
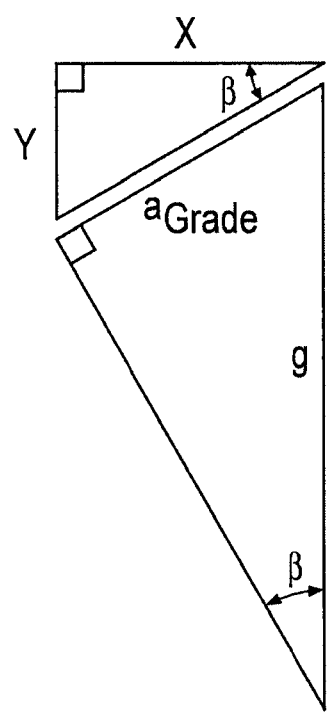
FIG. 8 illustrates a method of determining a driving surface incline based on acceleration measurements, according to a disclosed embodiment.

Using FIG. 8 as a guide, incline or percent grade is given by y/x. In FIG. 8, angle β is equal to the arcsin of ($a_{Grade}$/g). Thus, the percent grade y/x is given by equation 13. As the value of tan(arcsin(x)) may be rewritten as $x/(1-x2)^{1/2}$, equation 13 may be rewritten as equation 14. Recalling that grade acceleration $a_{Grade}$ is equal to the difference between longitudinal acceleration $a_{Long}$ and vehicular acceleration $a_{Veh}$, equation 14 may be expanded (as in equation 15) and then simplified (as in equation 16) to result in a solution for percent grade y/x in terms of longitudinal acceleration $a_{Long}$ and vehicular acceleration $a_{Veh}$.

$$\frac{y}{x} = \tan(\beta) = \tan\left(\arcsin\left(\frac{a_{grade}}{g}\right)\right). \quad \text{Equation 13}$$

$$\frac{y}{x} = \frac{a_{grade}}{g} \bigg/ \sqrt{\left(1 - \left(\frac{a_{grade}}{g}\right)^2\right)}. \quad \text{Equation 14}$$

$$\frac{y}{x} = \frac{(a_{Long} - a_{Veh})}{g} \bigg/ \sqrt{\left(1 - \left(\frac{a_{Long} - a_{Veh}}{g}\right)^2\right)}. \quad \text{Equation 15}$$

$$\frac{y}{x} = \frac{[\text{sign}(g)] \cdot (a_{Long} - a_{Veh})}{\sqrt{g^2 - (a_{Long} - a_{Veh})^2}} = \frac{(a_{Long} - a_{Veh})}{\sqrt{g^2 - (a_{Long} - a_{Veh})^2}}. \quad \text{Equation 16}$$

As described above in relation to equation 12, vehicular acceleration $a_{Veh}$ is measured by determining the derivative of a speed sensor in the vehicle's drivetrain, for example, the vehicle output speed or wheel speed sensors. However, under certain conditions, the signals output from the measured speed sensors can be unreliable. Specifically, questions arise regarding the reliability of these speed sensors during vehicle operation at low speed or when the vehicle is slipping on the vehicle's driving surface. Therefore, to improve the accuracy of the vehicular acceleration $a_{Veh}$ determinations, the time derivative of the vehicle's speed is determined using one of at least two methods. In the first method, speed sensor output data is sampled several times and the samples are averaged together to create an averaged sample. The derivative of the averaged speed samples is then determined by finding a difference between averaged samples. In the second method, a plurality of speed sensor data points are plotted with respect to time. Then, using a least squares method, a line is fit to the plotted data points. The determined slope of the line is the desired vehicular acceleration $a_{Veh}$.

To further improve the accuracy of the vehicular acceleration $a_{Veh}$ determinations, a model relating wheel speed to tire slip may also be implemented. Even on dry concrete, tires may slip as much as 20% during traction-limited acceleration. For lower friction coefficient surfaces, such as wet roads, the slip for a given acceleration also varies. Tire slip may be modeled as a linear function up to a peak friction coefficient where the tire breaks away. Using this linear relationship, measured wheel speed using a speed sensor may be compensated for tire slip as a function of the longitudinal acceleration $a_{Long}$. Tire slip, however, only creates an issue if vehicular acceleration is determined using speed sensors at driven wheels. If non-driven wheels are used to determine vehicular acceleration $a_{Veh}$, tire slip need not be compensated for. More complex models defining tire slip may also account for tire inflation pressure, tread depth, loads and temperature, among other factors.

Slope determination is an input in vehicle grade hunting systems and in dual-powered or hybrid-powered vehicles that many require a specific power source (e.g., gasoline or electric) when climbing slopes of a minimum grade.

Therefore, using a vehicle's accelerometer, the vehicle's mass, an applied drag force and a driving surface incline may be determined. In each case, only existing vehicle sensors are necessary to make the desired determinations. Once known, the determined results may be used in existing and new vehicle systems.

Figure 9:
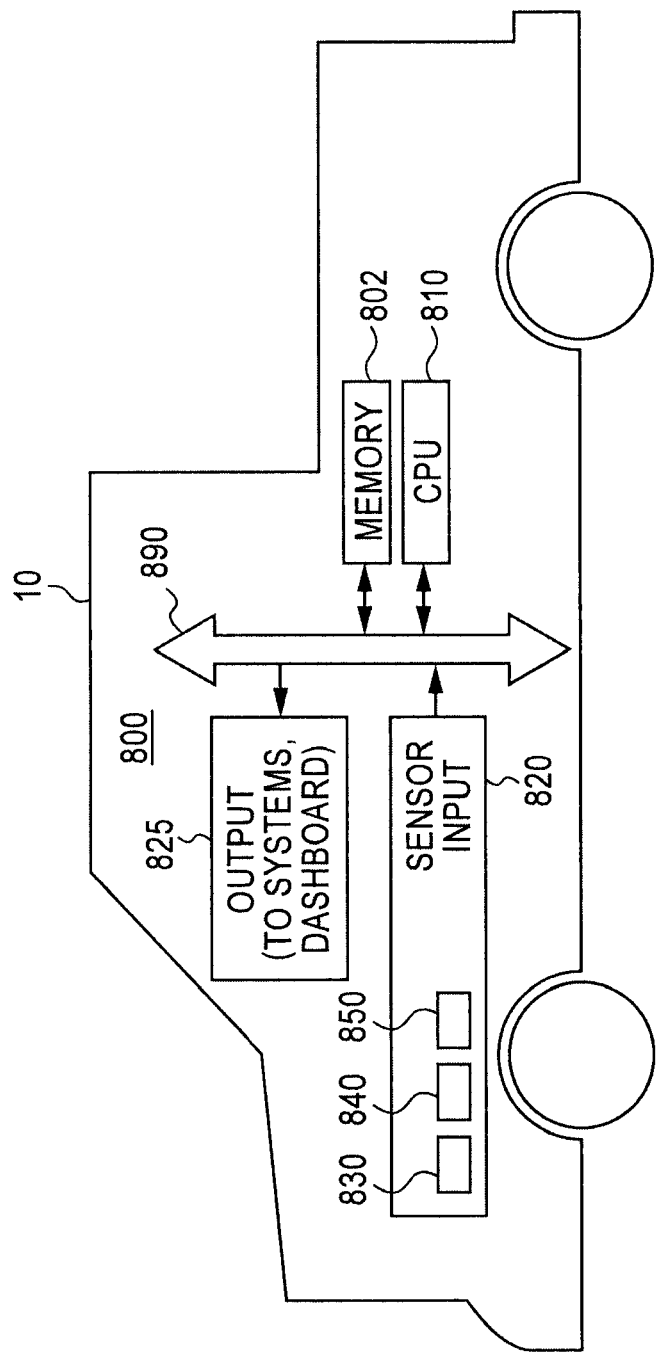
FIG. 9 is a vehicle processing system, according to a disclosed embodiment.

While some aspects of the above disclosure necessarily relate to hardware in a vehicle, methods of determining and applying the above-identified vehicle specifications may be implemented in either software or hardware. FIG. 9 reflects one such embodiment, illustrating a processor system 800 in a vehicle 10. The processor system 800 includes a memory device 802. A processor system, such as a computer system, generally comprises a central processing unit (CPU) 810, such as a microprocessor, a digital signal processor, or other programmable digital logic devices, which communicates with a sensor input 820 and an output device 825 over at least one bus 890. The memory device 802 communicates with the CPU 810 over bus 890 typically through a memory controller. The memory device 802 is used for storing samples obtained through the sensor input 820. The sensor input 820 is coupled to various sensors in the vehicle 10, including an accelerometer 830, speed sensor 840, and pressure sensor 850, among others. The CPU 810 processes data received through the sensor input 820 and outputs results such as the vehicle mass, drag force or driving surface incline through the output 825. Output results are either reused by various systems in vehicle 10 or are displayed to the users of the vehicle 10. Of course, multiple CPUs 810 may be used in system 800, and the entire system 800 could be implemented as a system on a chip (SOC), through integrated circuits (ICs), or through other methods known in the art.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the technology and are intended to be covered by the following claims.

What is claimed is:

1. A method of equipping a vehicle to determine and use at least one vehicle driving characteristic, the method comprising:

providing one or more accelerometers in the vehicle, at least one of the one or more accelerometers configured to output a plurality of accelerometer signals representing vehicle acceleration values at different times;

providing a speed sensor in the vehicle configured to output a plurality of vehicle speed signals representing vehicle speed values at different times;

determining, via a processor of the vehicle, a plurality of vehicle drive force values representing vehicle drive force at different times;

coupling the one or more accelerometers and speed sensor with the processor, the processor configured to process the plurality of accelerometer signals and vehicle drive force values to determine as an output signal a mass of the vehicle based on a difference between at least a portion of the plurality of accelerometer signals at different times and a difference between at least a portion of the vehicle drive force values that correspond in time with the portion of the plurality of accelerometer signals;

configuring the processor to determine the mass of the vehicle during vehicle operation by:

plotting the vehicle drive force values as a function of the vehicle speed values and the vehicle acceleration values, wherein each of the vehicle drive force, the vehicle speed, and the vehicle acceleration is assigned to a coordinate axes of a three-dimensional orthogonal coordinate system, and determining, using a least squares method, an interpolated surface that best fits the plotted values, the vehicle's mass being a slope of the interpolated surface in a drive force and acceleration plane of the plot; and coupling the processor with a vehicle control system, the vehicle control system configured to adjust, based on the vehicle mass output signal, at least one of an automatic trailer brake system, an electronic stability control system, and transmission shift control logic.

2. The method of claim 1, wherein the portion of the plurality of accelerometer signals is a most recently input portion of accelerometer signals.

3. The method of claim 2, further comprising sensing a vehicle mass change event.

4. The method of claim 3, further comprising configuring the processor to:

receive a signal indicative of a vehicle mass change event while the vehicle is not moving, and reset the portion of the plurality of accelerometer signals used such that only signals input after the vehicle mass change event are included.

5. The method of claim 1, further comprising providing a memory for storing the at least a portion of the plurality of accelerometer signals, wherein the stored accelerometer signals are stored with the corresponding vehicle speed value, as determined by the speed sensor in the vehicle.

6. The method of claim 5, further comprising configuring the processor to determine the mass of the vehicle by determining a difference between accelerometer signals with same corresponding speed values.

7. The method of claim 1, further comprising configuring the processor to modify the plurality of accelerometer signals to compensate for vehicle pitch due to acceleration.

8. The method of claim 1, further comprising providing one or more brake system pressure sensors in the vehicle whose output signals are used by the processor to derive a plurality of wheel torque values to determine drive force values to supplement the already determined drive force values.

9. The method of claim 1, further comprising providing a display to an operator of the vehicle, the display using as an input the mass determined by the processor and indicating the mass of the vehicle as a function of a total mass for which the vehicle is rated to carry.

10. The method of claim 1, further comprising providing the processor output signal for use in adjusting an amount of braking asserted by a trailer brake of a trailer attached to the vehicle, said adjustment based on the determined mass.

11. The method of claim 1, further comprising configuring the processor to process the plurality of accelerometer signals to determine drag force coefficients indicating a drag force acting upon the vehicle, the drag force coefficients being recursively determined for values of said plurality of accelerometer signals at a known vehicle speed and corresponding to a known vehicle drive force.

12. The method of claim 1, further comprising configuring the processor to process the plurality of accelerometer signals to determine an incline of a driving surface upon which the vehicle operates, the incline determination based on a difference between the at least a portion of the plurality of accelerometer signals and vehicular acceleration values arising from the derivative of a wheel speed of the vehicle.

13. A vehicle system, the system comprising:

one or more accelerometers in the vehicle;

at least one speed sensor in the vehicle;

a drivetrain of the vehicle, the drive train having a determinable drive force; and a processor configured to:

receive from the one or more accelerometers a plurality of signals representing vehicle acceleration values at different times;

receive from the at least one speed sensor a plurality of signals representing vehicle speed values at different times;

receive a plurality of vehicle drive force signals representing vehicle drive force values at different times;

determine a mass of the vehicle during vehicle operation based on a difference between at least a portion of the plurality of accelerometer signals at different times and a difference between at least a portion of the vehicle drive force signals that correspond in time with the portion of the plurality of accelerometer signals by:

plotting the vehicle drive force values as a function of the vehicle speed values and the vehicle acceleration values, wherein each of the vehicle drive force, the vehicle speed, and the vehicle acceleration is assigned to a coordinate axes of a three-dimensional orthogonal coordinate system, and determining, using a least squares method, an interpolated surface that best fits the plotted signal values, the vehicle's mass being a slope of the interpolated surface in a drive force and acceleration plane of the plot; and a vehicle control system coupled to the processor, the vehicle control system configured to adjust, based on the determined vehicle mass, at least one of an automatic trailer brake system, an electronic stability control system, and transmission shift control logic.

14. The system of claim 13, further comprising a display for indicating to an operator of the vehicle the mass of the vehicle as a function of a total mass for which the vehicle is rated to carry.

15. The system of claim 13, wherein the processor is further configured to determine drag force coefficients indicating a drag force acting upon the vehicle, the processor being configured to recursively determine the drag force coefficients for values of said plurality of accelerometer signals at a known vehicle speed and corresponding to a known vehicle drive force.

16. The system of claim 13, wherein the processor is further configured to determine an incline of a driving surface upon which the vehicle operates, the incline determination based on a difference between the at least a portion of the plurality of accelerometer signals and vehicular acceleration values arising from the derivative of a wheel speed of the vehicle.

* * * * *